United States Patent
Lim et al.

(10) Patent No.: US 10,051,687 B2
(45) Date of Patent: Aug. 14, 2018

(54) METHOD FOR TRANSMITTING FRAME IN WIRELESS LAN SYSTEM

(71) Applicant: LG ELECTRONICS INC., Seoul (KR)

(72) Inventors: Dongguk Lim, Seoul (KR); Wookbong Lee, Seoul (KR); Jinyoung Chun, Seoul (KR); Jinsoo Choi, Seoul (KR); Hangyu Cho, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/515,123

(22) PCT Filed: Apr. 8, 2015

(86) PCT No.: PCT/KR2015/003516
§ 371 (c)(1),
(2) Date: Mar. 28, 2017

(87) PCT Pub. No.: WO2016/068413
PCT Pub. Date: May 6, 2016

(65) Prior Publication Data
US 2017/0223770 A1 Aug. 3, 2017

Related U.S. Application Data

(60) Provisional application No. 62/068,766, filed on Oct. 27, 2014, provisional application No. 62/069,853, (Continued)

(51) Int. Cl.
H04B 7/00 (2006.01)
H04B 1/00 (2006.01)
(Continued)

(52) U.S. Cl.
CPC ............ *H04W 88/06* (2013.01); *H04L 5/0007* (2013.01); *H04L 5/0094* (2013.01);
(Continued)

(58) Field of Classification Search
CPC ...... H04W 88/06; H04W 48/10; H04W 48/12; H04L 5/0007; H04L 27/262613
(Continued)

(56) References Cited

U.S. PATENT DOCUMENTS 9,843,654 B2 * 12/2017 Vermani ................. H04L 69/18
9,853,845 B2 * 12/2017 Li ............................ H04L 27/20
(Continued)

OTHER PUBLICATIONS

PCT International Application No. PCT/KR2015/003516, Written Opinion of the International Searching Authority dated Jul. 13, 2015, 19 pages.
(Continued)

Primary Examiner — Tilahun B Gesesse
(74) Attorney, Agent, or Firm — Lee Hong Degerman Kang Waimey

(57) ABSTRACT

The present document relates to a wireless communication system and, more particularly, to a method for transmitting a frame in a high-density wireless LAN system, and a station device for performing the method. To this end, a station for transmitting a frame is comprised of a radio frame for a second type station comprising a frame portion for a first type station and a frame portion for the second type station, wherein the frame portion for the first type station comprises a first OFDM symbol for transmitting a signaling field (L-SIG) for the first type station, and the frame portion for the second type station comprises one or more second OFDM symbols for transmitting a signaling field (HE-SIG) for the second type station. Additionally, the radio frame for the second type station further comprises one or more third
(Continued)

OFDM symbols for transmitting the L-SIG and the HE-SIG repeatedly.

14 Claims, 11 Drawing Sheets

Related U.S. Application Data filed on Oct. 29, 2014, provisional application No. 62/072,432, filed on Oct. 30, 2014.

(51) Int. Cl.

| | |
|---|---|
| *H04B 1/04* | (2006.01) |
| *H04W 88/06* | (2009.01) |
| *H04L 5/00* | (2006.01) |
| *H04W 84/04* | (2009.01) |
| *H04L 27/26* | (2006.01) |
| *H04W 48/10* | (2009.01) |
| *H04W 48/12* | (2009.01) |
| *H04W 74/00* | (2009.01) |
| *H04W 84/12* | (2009.01) |

(52) U.S. Cl.
CPC ......... *H04L 27/2613* (2013.01); *H04W 48/10* (2013.01); *H04W 48/12* (2013.01); *H04W 74/004* (2013.01); *H04W 74/006* (2013.01); *H04W 84/045* (2013.01); *H04W 84/12* (2013.01)

(58) Field of Classification Search
USPC ..................................... 455/552.1, 78, 550.1
See application file for complete search history.

(56) References Cited

U.S. PATENT DOCUMENTS

| | | | |
|---|---|---|---|
| 2012/0177144 A1* | 7/2012 | Lee | H04L 27/2602 375/308 |
| 2013/0107981 A1 | 5/2013 | Sampath et al. | |
| 2013/0142115 A1 | 6/2013 | Yu et al. | |
| 2013/0336257 A1 | 12/2013 | Lee et al. | |
| 2015/0139206 A1* | 5/2015 | Azizi | H04L 5/003 370/338 |
| 2017/0230157 A1* | 8/2017 | Kenney | H04L 5/0048 |

OTHER PUBLICATIONS

Chun, J. et al., "Legacy Support on HEW frame structure," doc.: IEEE 11-13/1057r0, Sep. 2013, 9 pages.

\* cited by examiner

Fig. 6

| L-STF | L-LTF | L-SIG | HE-SIG A | HE-STF | HE-LTF | HE-SIG B | Data |
|-------|-------|-------|----------|--------|--------|----------|------|
| L-STF | L-LTF | L-SIG | HE-SIG A |        |        |          |      |
| L-STF | L-LTF | L-SIG | HE-SIG A |        |        |          |      |
| L-STF | L-LTF | L-SIG | HE-SIG A |        |        |          |      |

Fig. 7

| L-STF | L-LTF | L-SIG | HE-SIG A | HE-SIG B | HE-STF | HE-LTF | Data |
|-------|-------|-------|----------|----------|--------|--------|------|
| L-STF | L-LTF | L-SIG | HE-SIG A |          |        |        |      |
| L-STF | L-LTF | L-SIG | HE-SIG A |          |        |        |      |
| L-STF | L-LTF | L-SIG | HE-SIG A |          |        |        |      |

Fig. 8

| L-STF | L-LTF | L-SIG | HE-SIG A |         | HE-STF | HE-LTF | Data for STA1 |
|-------|-------|-------|----------|---------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A |         | HE-STF | HE-LTF | Data for STA3 |
| L-STF | L-LTF | L-SIG | HE-SIG A |         | HE-STF | HE-LTF | Data for STA4 |

Fig. 9

| L-STF | L-LTF | L-SIG | HE-SIG A | HE-SIG B | HE-STF | HE-LTF | Data for STA 1 |
|-------|-------|-------|----------|----------|--------|--------|----------------|
| L-STF | L-LTF | L-SIG | HE-SIG A | HE-SIG B | HE-STF | HE-LTF | Data for STA 2 |
| L-STF | L-LTF | L-SIG | HE-SIG A | HE-SIG B | HE-STF | HE-LTF | Data for STA 3 |
| L-STF | L-LTF | L-SIG | HE-SIG A | HE-SIG B | HE-STF | HE-LTF | Data for STA 4 |

METHOD FOR TRANSMITTING FRAME IN WIRELESS LAN SYSTEM

CROSS-REFERENCE TO RELATED APPLICATIONS

This application is the National Stage filing under 35 U.S.C. 371 of International Application No. PCT/KR2015/003516, filed on Apr. 8, 2015, which claims the benefit of U.S. Provisional Application Nos. 62/068,766, filed on Oct. 27, 2014, 62/069,853, filed on Oct. 29, 2014, and 62/072,432, filed on Oct. 30, 2014, the contents of which are all hereby incorporated by reference herein in their entirety.

TECHNICAL FIELD

The present invention relates to a wireless communication system, and more particularly, to a method for transmitting a frame in a high-density wireless local area network (WLAN) system and station device for performing the same.

BACKGROUND ART

First of all, a wireless local area network (WLAN) system is described as an example of the system to which the present invention can be applied.

Standards for a wireless local area network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying orthogonal frequency division multiplexing (OFDM) at 2.4 GHz. IEEE 802.11n provides a transmission rate of 300 Mbps for four spatial streams by applying multiple input multiple output (MIMO)-OFDM. In IEEE 802.11n, a channel bandwidth is supported up to 40 MHz and in this case, a transmission rate of 600 Mbps is provided.

The above-described WLAN standards have evolved into IEEE 802.11ac standards that provides a bandwidth of up to 160 MHz and a transmission rate of up to 1 Gbit/s by supporting eight spatial streams. Currently, IEEE 802.11ax standards are under discussion.

DISCLOSURE OF THE INVENTION

Technical Task

In the above-mentioned IEEE 802.11ax standards, a new frame structure is under discussion to implement high-speed wireless communication in a high-density wireless environment.

In particular, since in the new frame structure, a frame portion for a legacy terminal (e.g., 802.11a terminal) coexists with a frame portion for a terminal supporting IEEE 802.11ax, additional discussion on how to configure and transmit a preamble for the IEEE 802.11ax terminal is required.

Technical Solutions

In an aspect of the present invention, provided herein is a method for transmitting a frame by a first station in a wireless local area network (WLAN) system, including: configuring a radio frame for a second type of station including a frame portion for a first type of station and a frame portion for the second type of station; and, wherein the frame portion for the first type of station may include a first OFDM symbol for transmitting a legacy signaling field (L-SIG) for the first type of station, wherein the frame portion for the second type of station may include at least one second OFDM symbol for transmitting a high efficiency signaling field (HE-SIG) for the second type of station, and wherein the radio frame for the second type of station may be configured to further include at least one third OFDM symbol for repeatedly transmitting the L-SIG and the HE-SIG, transmitting the configured radio frame for the second type of station to a second station. In this case, the first station and the second station may be the second type of station.

The radio frame for the second type of station may include a first interval, which is composed of OFDM symbols with a first length in a time domain, and a second interval, which is composed of OFDM symbols with a length corresponding to an integer multiple of the first length, the first interval may include the frame portion for the first type of station and the HE-SIG, and the second interval may include a portion obtained by excluding the HE-SIG from the frame portion for the second type of station. In this case, the first interval may further include a third OFDM symbol interval.

The L-SIG and the HE-SIG may be repeatedly transmitted through the first to the third OFDM symbols and the repeated transmission may correspond to application of a lowest modulation and coding scheme (MCS) defined for the first type of station or an MCS lower than the lowest MCS.

Additionally, the L-SIG and the HE-SIG may be transmitted such that the L-SIG and the HE-SIG are mapped to different locations in a frequency region corresponding to the third OFDM symbol. Specifically, one of the L-SIG and the HE-SIG may be mapped to an even-numbered tone in the frequency region corresponding to the third OFDM symbol and the other one of the L-SIG and the HE-SIG may be mapped to an odd-numbered tone in the frequency region corresponding to the third OFDM symbol.

Partial information of the L-SIG transmitted through the first OFDM symbol and partial information of the HE-SIG transmitted through the second OFDM symbol may be repeatedly transmitted through the L-SIG and the HE-SIG repeatedly transmitted through the third OFDM symbol, respectively.

The third OFDM symbol may be located between the first OFDM symbol and the second OFDM symbol.

Additionally, the HE-SIG may include a first signaling field (HE-SIG A) for the second type of station, which carries common control information, and a second signaling field (HE-SIG B) for the second type of station, which carries user-specific control information. In this case, at least one of the HE-SIG A and the HE-SIG B may be repeatedly transmitted through the third OFDM symbol.

A signal that constitutes at least one of the SIG A for the second type of station and the SIG B for the second type of station may be repeated N times in unit of n bits where N and n may be positive integers equal to or greater than 2.

Further, at least one of interleaving and scrambling may be performed on the N times repeated signal.

The second type of station may be a station that supports communication schemes in accordance with IEEE 802.11ax standards and the first type of station may be a legacy station.

In another aspect of the present invention, provided herein is a station device operating as a first station in a wireless local area network (WLAN) system, including: a processor configured to configure a radio frame for a second type of station including a frame portion for a first type of station and a frame portion for the second type of station; and a transmitter configured to transmit the radio frame for the second type of station configured by the processor, wherein the frame portion for the first type of station may include a first OFDM symbol for transmitting a signaling field (L-SIG) for the first type of station, wherein the frame portion for the second type of station may include at least one second OFDM symbol for transmitting a signaling field (HE-SIG) for the second type of station, and wherein the processor may configure the radio frame for the second type of station to further include at least one third OFDM symbol for repeatedly transmitting the L-SIG and the HE-SIG.

Advantageous Effects

According to the present invention, it is possible to operate a frame that not only allows high-efficiency wireless communication but also minimize effects on the existing standard technology.

Specifically, the convention L-SIG and the HE-SIG in accordance with the newly defined WLAN standards are repeatedly transmitted, whereby transmission reliability can be further improved.

DESCRIPTION OF DRAWINGS

FIG. 6 is a diagram for explaining a frame configuration method according to an embodiment of the present invention.

FIGS. 7 to 9 are diagrams for explaining frame configuration methods according to different embodiments of the present invention.

BEST MODE FOR INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

The following description relates to a method for transmitting a preamble in a WLAN system and station device for performing the same. To this end, the WLAN system to which the present invention can be applied will be explained in detail.

Figure 1:
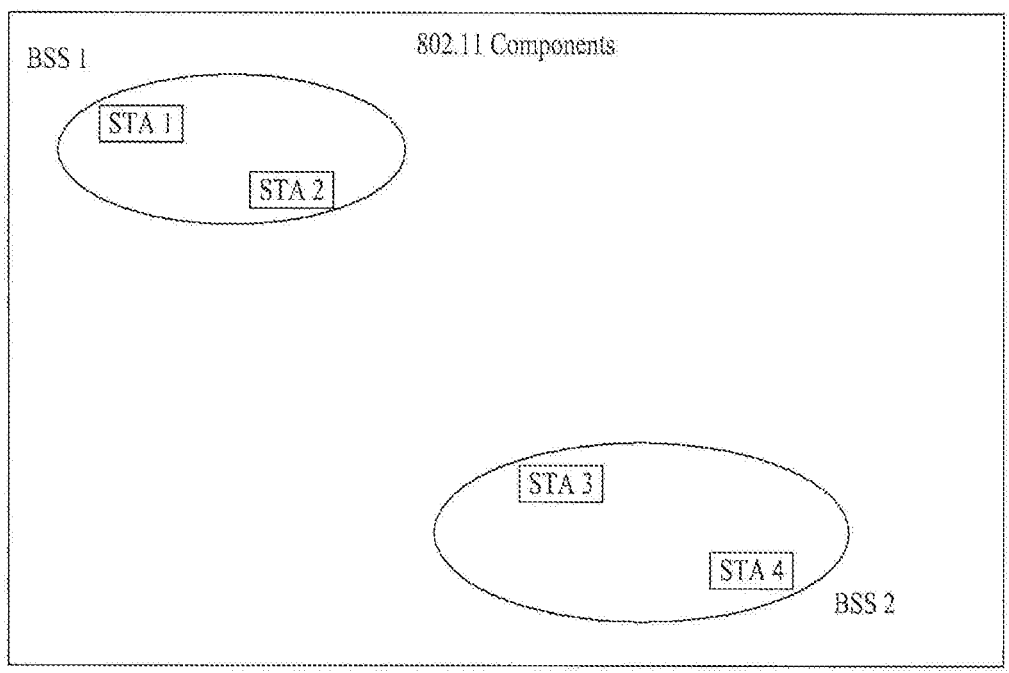
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
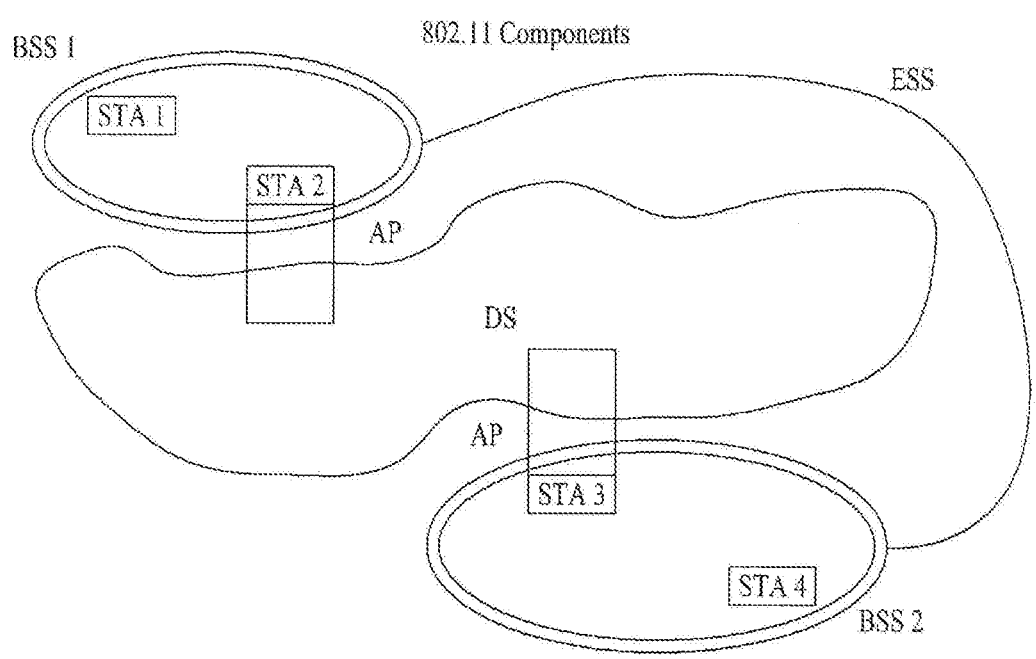
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above discussion, a frame structure that can be used in the WLAN system will be described.

Figure 3:
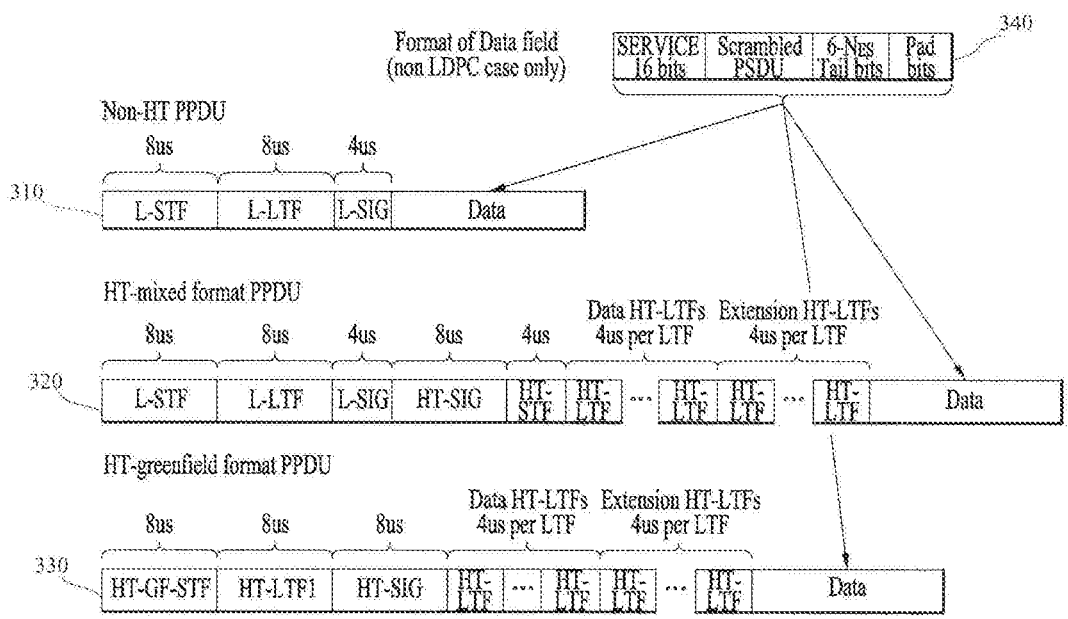
FIG. 3 is a diagram for explaining a frame structure that can be used in a WLAN system.

FIG. 3 is a diagram for explaining the frame structure that can be used in the WLAN system.

Specifically, in FIG. 3, reference numeral 310 denotes a physical layer protocol data unit (PPDU) format for a terminal in accordance with IEEE 802.11a/g standards and reference numerals 320 and 330 denote PPDU formats for a terminal in accordance with IEEE 802.11n standards. As shown in FIG. 3, a terminal supporting IEEE 802.11n schemes uses frames denoted by a prefix of "HT-".

More specifically, the reference numeral 320 denotes an HT-mixed format PPDU of the IEEE 802.11n terminal and the reference numeral 330 denotes an HT-greenfield format PPDU of the IEEE 802.11n terminal.

In addition, reference numeral 340 denotes a configuration of data in each PPDU and a physical service data unit (PSDU) is included in a data region.

Figure 4:
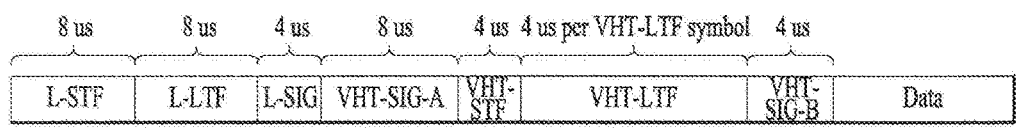
FIG. 4 illustrates a frame format according to an IEEE 802.11ac standard technology.

FIG. 4 illustrates the frame format according to the IEEE 802.11ac standard technology.

As shown in FIG. 4, a terminal in accordance with IEEE 802.11ac standards supports fields denoted by a prefix of "VHT-".

Details of individual fields illustrated in FIG. 4 are summarized in Table 1 below.

TABLE 1

| Field | Description |
|---|---|
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) |

Figure 5:
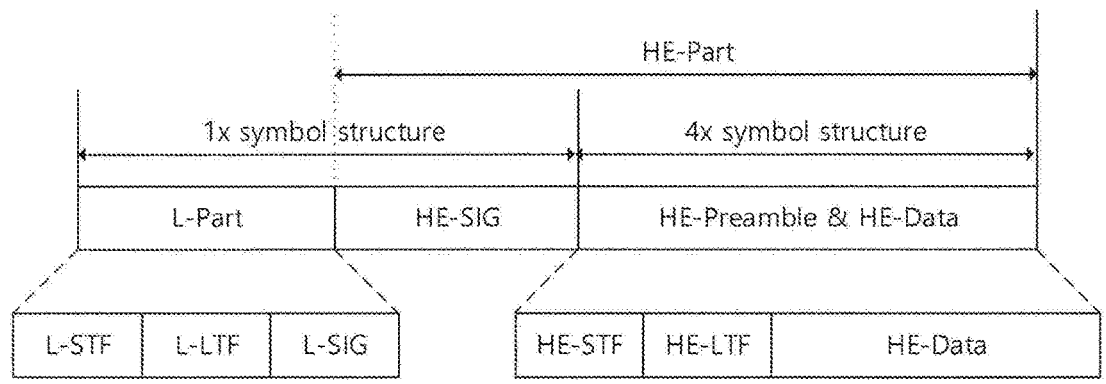
FIG. 5 is a diagram illustrating a frame format available in a new standards as an embodiment of the present invention.

FIG. 5 is a diagram illustrating a frame format available in a new standards as an embodiment of the present invention.

In FIG. 5, "L-Part" indicates a frame portion for a legacy terminal (i.e., a frame portion for a first type of terminal), and "HE-Part" indicates a frame portion for a terminal in accordance with an enhanced standard technology (e.g., IEEE 802.11ax) (i.e., a frame portion for a second type of terminal). In this case, it is preferred that the frame portion in accordance with the new standards has a length greater by an integer multiple than that of the frame portion for the legacy terminal in a time domain. FIG. 5 shows an example of the frame structure in the 802.11ax where a conventional 1x symbol structure (i.e., 3.2 us) is maintained until an HE-SIG, whereas a 4x symbol structure (i.e., 12.8 us) is used for an HE-preamble and data.

In the case of the "L-Part" in the example of FIG. 5, an L-STF, L-LTF, and L-SIG can be maintained similar to a configuration of the conventional Wi-Fi system as illustrated in FIG. 3 and FIG. 4.

The newly defined HE-SIG in the HE-Part may have fields for indicating common control information and user-specific information. As illustrated in FIG. 5, the 1x symbol structure is used in the HE-SIG similar to the L-Part. On the other hand, since the 4x symbol structure is used in the HE-preamble and data, a frequency tone (FT) that can be used per bandwidth is increased by four times compared to the conventional Wi-Fi system. In addition, the number of available tones may also be changed. Therefore, the HE-preamble (HE-STF and HE-LTF) can be newly designed to support the increased FT and the changed available tones.

Hereinafter, a description will be given of a method for efficiently configuring and transmitting the HE-Part based on the above-mentioned design.

FIG. 6 is a diagram for explaining a frame configuration method according to an embodiment of the present invention.

According to the PPDU format illustrated in FIG. 6, a PPDU for a single STA is transmitted in a total of an 80-MHz bandwidth through four 20 MHz channels. However, a PPDU can be transmitted through each of the four 20 MHz channels and thus the four 20 MHz channels may carry PPDUs for different STAs, respectively.

The L-STF, L-LTF, and L-SIG may be transmitted in an OFDM symbol generated based on 64-FFT (64 subcarriers) in each 20 MHz channel Meanwhile, it is proposed that the HE-Part includes two signaling fields. In addition, it is assumed that a first signaling field (hereinafter referred to as 'SIG 1' or 'SIG A') carries common control information and a second signaling field (hereinafter referred to as 'SIG 2' or 'SIG B') provides information necessary for data transmission.

An HE-SIG A may provide common control information, which will be commonly applied to STAs receiving the corresponding PPDU. The HE-SIG A may be transmitted in two or three OFDM symbols. Table 2 shows information included in the HE-SIG A.

TABLE 2

| FIELD | BIT NUMBER | DESCRIPTION |
|---|---|---|
| Bandwidth | 2 | Indicating a bandwidth in which a PPDU is transmitted. For example, 20 MHz, 40 MHz, 80 MHz or 160 MHz |
| Group ID | 6 | Indicating an STA or a group of STAs that will receive a PPDU |
| Stream information | 12 | Indicating the number or location of spatial streams for each STA, or the number or location of spatial streams for a group of STAs |
| Uplink (UL) indication | 1 | Indicating whether a PPDU is destined to an AP (uplink) or to an STA (downlink) |
| MU indication | 1 | Indicating whether a PPDU is an SU-MIMO PPDU or an MU-MIMO PPDU |
| Guard Interval (GI) indication | 1 | Indicating whether a short GI or a long GI is used |
| Allocation information | 12 | Indicating a band or a channel (subchannel index or subband index) allocated to each STA in a bandwidth in which a PPDU is transmitted |

TABLE 2-continued

| FIELD | BIT NUMBER | DESCRIPTION |
| --- | --- | --- |
| Transmission power | 12 | Indicating a transmission power for each channel or each STA |

The names and formats of the individual fields in Table 2 are merely exemplary and the HE-SIG A according to the present invention may have a form different from that shown in Table 2.

The HE-STF may be used to improve performance of AGC estimation in MIMO transmission and the HE-LTF may be used to estimate an MIMO channel An HE-SIG B may include user-specific information that is required for each STA to receive its data (i.e., a physical layer service data unit (PSDU)). For example, the HE-SIG B may include information on a length of a corresponding PSDU and an MCS level of the corresponding PSDU. Such an HE-SIG B may be transmitted in one or two OFDM symbols.

Meanwhile, each of the L-STF, L-LTF, L-SIG, and HE-SIG A may be repeatedly transmitted in a 20 MHz channel That is, the L-STF, L-LTF, L-SIG, and HE-SIG A shown in FIG. 6 are transmitted through four channels but each of them may contain the same information.

In FIG. 6, an FFT size per unit frequency may be increased from the HE-STF (or from the HE-SIG A). For example, a 256 FFT size may be used in a 20 MHz channel, a 512 FFT size may be used in a 40 MHz channel, and a 1024 FFT size may be used in an 80 MHz channel If an FFT size is increased, the number of OFDM subcarriers per unit frequency is increased. This is because a spacing between OFDM subcarriers is reduced but an OFDM symbol time is increased. To improve efficiency, a guard interval (GI) after the HE-STF may be configured to be the same as that after the HE-SIG A.

FIG. 7 is a diagram for explaining a frame configuration method according to another embodiment of the present invention.

FIG. 7 is identical to FIG. 6, except that the HE-SIG B is placed immediately after the HE-SIG A. The FFT size per unit frequency may be increased after the HE-STF (or the HE-SIG B).

FIG. 8 is a diagram for explaining a frame configuration method according to a further embodiment of the present invention.

Similar to FIG. 7, FIG. 8 shows an example in which the HE-SIG B is placed immediately after the HE-SIG A. In FIG. 8, it can be seen that 20 MHz channels are allocated to different STAs, for example, STA 1 to STA 4 and then data is transmitted.

In the example of FIG. 8, although it is assumed that the HE-SIG B includes information necessary for each STA to receive data as described above, the HE-SIG B is encoded over an entire band. That is, the HE-SIG B may be received by all the STAs. The FFT size per unit frequency may be increased after the HE-STF (or the HE-SIG B).

FIG. 9 is a diagram for explaining a frame configuration method according to still a further embodiment of the present invention.

Similar to FIG. 8, FIG. 9 shows an example in which the HE-SIG B is placed immediately after the HE-SIG A. However, in the example of FIG. 9, the HE-SIG B is separately transmitted in each 20 MHz channel. In this way, the structure shown in FIG. 7 can also be changed such that the HE-SIG B is transmitted in each 20 MHz channel If the FFT size is increased, an STA that supports conventional IEEE 802.11a/g/n/ac cannot decode a corresponding PPDU. For coexistence between a legacy STA and an HE STA, it is proposed that even though FFT sizes of other fields are increased, each of the L-STF, L-LTF, and L-SIG are transmitted with a 64 FFT size in a 20 MHz channel. For instance, the L-SIG may be transmitted in a single OFDM symbol, an interval for the single OFDM symbol may be 4 um, and a GI may be 0.8 um.

The HE-SIG A includes information necessary for the HE STA to receive an HE PPDU. However, the HE-SIG A may be transmitted with a 64 FFT size in a 20 MHz channel so that it can be received by both of the legacy STA and the HE STA. This is because to allow the HE STA to receive not only the HE PPDU but also conventional HT/VHT PPDUs. To this end, a method for enabling a legacy STA and an HE STA to distinguish between an HE PPDU and an HT/VHT PPDU is required.

Figure 10:
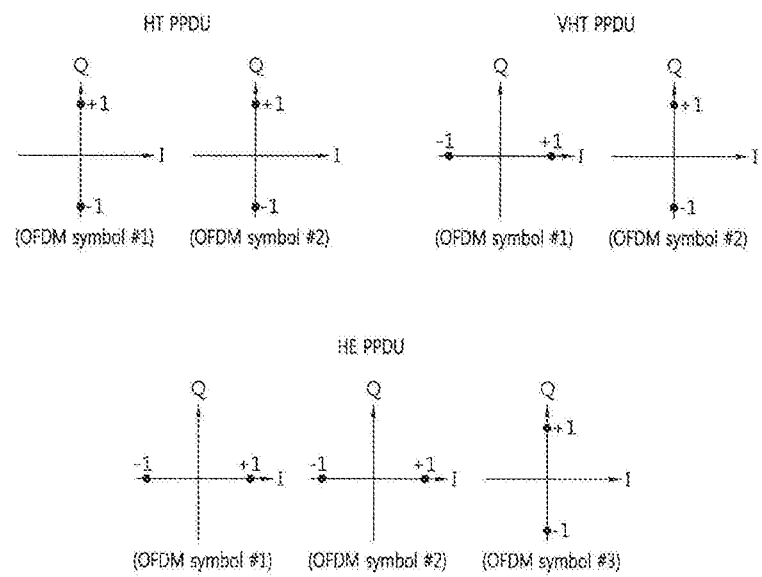
FIG. 10 is a diagram for explaining a method for distinguishing between an HE PPDU and a legacy PPDU according to an embodiment of the present invention.

FIG. 10 is a diagram for explaining a method for distinguishing between an HE PPDU and a legacy PPDU according to an embodiment of the present invention.

Specifically, FIG. 10 illustrates an example of a method for distinguishing between PPDUs using phase rotation. That is, for classification of PPDUs, constellation phases of OFDM symbols after the L-STF, L-LTF, and L-SIG may be rotated and transmitted as show in FIG. 10.

In the case of the HE PPDU illustrated in the example of FIG. 10, phases of three OFDM symbols after the L-SIG are rotated. The phases of OFDM symbol #1 and OFDM symbol #2 are not rotated but the phase of the OFDM symbol #3 may be counterclockwise rotated by 90 degrees and then transmitted. BPSK modulation may be applied to the OFDM symbol#1 and the OFDM symbol #2 and QBPSK modulation may be applied to the OFDM symbol#3.

If the HE-SIG A is transmitted in three OFDM symbols after the L-SIG, it is possible to consider that all the three OFDM symbols are used to transmit the HE-SIG A.

The HE-SIG may be configured with at least one OFDM/A symbol depending on information transmitted through the HE-SIG (i.e., HE-SIG A or HE-SIG B). In addition, when the L-SIG cannot be received reliably, the information on the length may be transmitted by being included in common control information in the HE-SIG (or HE-SIG1). In this case, the number of OFDM/A symbols allocated for the HE-SIG (or HE-SIG1) may be increased to contain such information.

Figure 11:
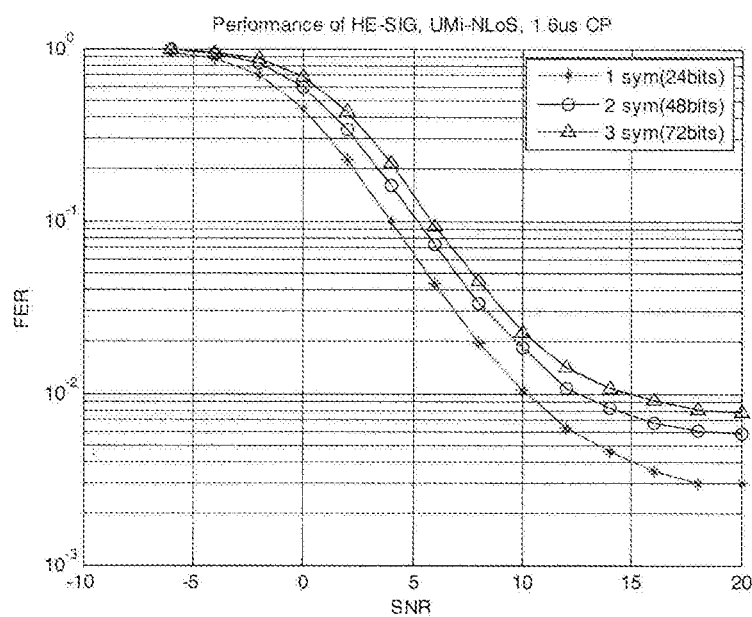
FIGS. 11 and 12 are graphs showing performance changes depending on increase in the number of symbols constituting an HE-SIG.
Figure 12:
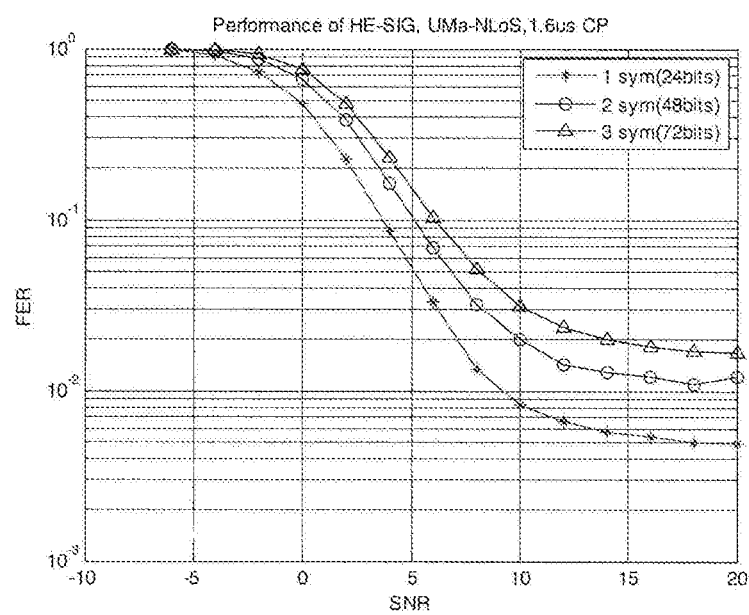

FIGS. 11 and 12 are graphs showing performance changes depending on increase in the number of symbols constituting an HE-SIG.

FIG. 11 shows that when a CP of 1.6 us is used in an UMi-nLoS environment, performance changes in case of one, two, and three OFDM symbols. FIG. 12 shows that when the same CP of 1.6 us is used in an UMa-nLoS environment, performance changes depending on changes in the number of symbols for the HE-SIG.

In both FIGS. 11 and 12, it can be seen that as the number of the symbols constituting the HE-SIG increases, an FER increases under the same SNR situation. This may imply that increase in the number of HE-SIG symbols causes negative effects on the performance.

Since information on packet transmission is transmitted through the L-SIG and the HE-SIG, 11ax terminals should correctly receive the L-SIG and the HE-SIG to receive packets successfully. That is, performance for reception of the L-SIG and the HE-SIG may act as a bottleneck in data reception performance Therefore, as a method for improving 11ax packet reception performance, a method for transmitting an L-SIG and an HE-SIG by loading signals for the L-SIG and the HE-SIG together in one or more symbols to improve performance of the L-SIG and the HE-SIG is proposed in an aspect of the present invention.

Figure 13:
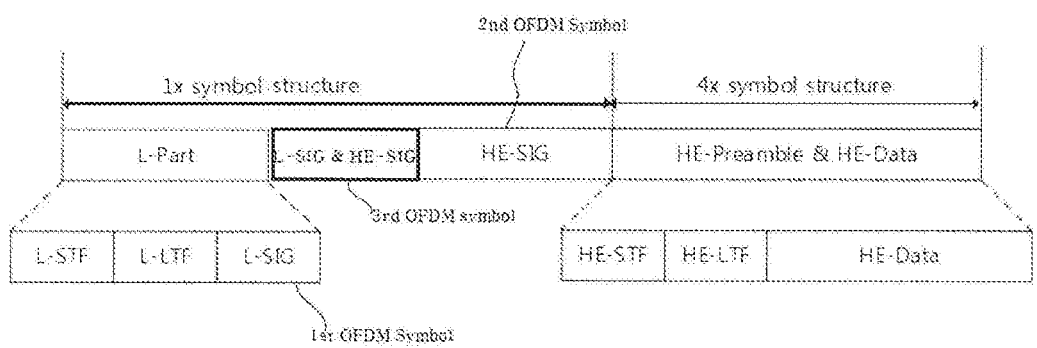
FIG. 13 is a diagram for explaining a method for improving transmission reliability of an L-SIG and an HE-SIG according to an embodiment of the present invention.

FIG. 13 is a diagram for explaining a method for improving transmission reliability of an L-SIG and an HE-SIG according to an embodiment of the present invention.

As described above, the L-SIG and the HE-SIG, which carry control information, should be correctly received for successful 11ax packet reception. Thus, to improve performance for reception of the L-SIG and the HE-SIG, an embodiment of the present invention proposes that an existing L-SIG symbol and HE-SIG symbol are maintained as the same, whereas signals for the L-SIG and the HE-SIG are loaded together in one or more symbols and additionally transmitted. That is, when an OFDM symbol for transmitting the L-SIG shown in FIG. 5 is defined as a first OFDM symbol and an OFDM symbol for transmitting the HE-SIG shown in FIG. 5 is defined as a second OFDM symbol as illustrated in FIG. 13, the present invention proposes to additionally configure at least one third OFDM symbol for repeatedly transmitting both of the L-SIG and the HE-SIG. Here, each of the first to the third OFDM symbols may correspond to one or a plurality of OFDM symbols.

According to the present embodiment, the signals for the L-SIG and the HE-SIG may be entirely repeated in a single symbol (third OFDM symbol). Alternatively, only certain parts of the signals may be repeated and transmitted using a specific portion (e.g., time or frequency) of the symbol. When only the certain parts are repeatedly transmitted, the signals for the L-SIG and the HE-SIG may be mixed with each other in one symbol and then transmitted. For instance, the signals for the L-SIG and the HE-SIG may be loaded together in one symbol and then transmitted.

Repeated Transmission in Time Domain

According to an embodiment of the present invention, symbols for the L-SIG and the HE-SIG are repeatedly transmitted and the repeated symbols may be transmitted consecutively after the existing SIG symbol. The L-SIG and the HE-SIG are respectively transmitted through individual symbols (i.e., first and second OFDM symbols) using the conventional 1x symbol structure as shown in FIG. 13. In addition, the signals for the L-SIG and the HE-SIG may be loaded in symbols (third OFDM symbols) different from the above symbols and then transmitted.

To guarantee robustness of the L-SIG and the HE-SIG, they may be transmitted using MCS0 (i.e., BPSK 1/2). In addition, by repeatedly transmitting the symbols as described above, the L-SIG and the HE-SIG may have the same effect as that when they are transmitted using an MCS lower than the MCS0. In this case, the number of times of repetition may be equal to or greater than 2. Meanwhile, the number of times of repetition for the L-SIG and the number of times of repetition for the HE-SIG may be different from each other.

In this case, the repeated symbols (third OFDM symbols) may be transmitted using the same method as that used for transmitting the existing SIG. Alternatively, a more robust transmission method may be used.

Repetition in Frequency Domain

In another embodiment of the present invention, it is proposed to repeatedly transmit the L-SIG and the HE-SIG in the frequency domain As one particular example, the L-SIG and the HE-SIG may be repeatedly transmitting using an even-numbered tone and an odd-numbered tone of a carrier, respectively.

In this case, the L-SIG and the HE-SIG are also respectively transmitted through the individual symbols (i.e., first and second OFDM symbols) using the conventional 1x symbol structure. In addition, the signals for the L-SIG and the HE-SIG may also be loaded in the symbols (third OFDM symbols) different from the above symbols and then transmitted.

However, the present embodiment proposes that information transmitted in an odd-numbered tone of a symbol is different from information transmitted in an even-numbered tone of the symbol. In other words, the embodiment proposes to transmit information on the signals for the L-SIG and the HE-SIG by loading them together. In this case, a combination of tone locations where the L-SIG and the HE-SIG are transmitted can be expressed as follows: (1) even-numbered tone—L-SIG and odd-numbered tone—H-SIG and (2) even-numbered tone—HE-SIG and odd-numbered tone—S-SIG.

According this embodiment, since only a specific tone is used to transmit information, information amounting to the number of corresponding tones can be repeatedly transmitted. In this case, the number of the third OFDM symbols used to improve reliability of the L-SIG and the HE-SIG may be equal to or greater than 1. In addition, the third OFDM symbols may be transmitted using the same method as that used for transmitting the existing SIG. Alternatively, a more robust transmission method may be used.

According to a further embodiment of the present invention, the L-SIG and the HE-SIG can be repeatedly transmitted by dividing a frequency region of the symbol into a low frequency region and a high frequency region. In this embodiment, the L-SIG and the HE-SIG are also respectively transmitted through the individual symbols (i.e., first and second OFDM symbols) using the conventional 1x symbol structure. In addition, the signals for the L-SIG and the HE-SIG may also be loaded in the symbols (third OFDM symbols) different from the above symbols and then transmitted.

Such symbols are transmitted using the conventional 1x symbol structure (64-FFT). In this case, by dividing the frequency region in half, i.e., into the low frequency region and the high frequency region, different information (e.g., the signals for the L-SIG and the HE-SIG) may be transmitted in each of the two divided frequency regions.

FIGS. 14 to 17 are diagrams for explaining a method for repeatedly transmitting some of signals for an L-SIG and an HE-SIG according to an embodiment of the present invention.

Although examples of FIGS. 14 to 17 illustrate that the number of each of the first OFDM symbol for transmitting the L-SIG, the second OFDM symbol for transmitting the HE-SIG, and the third OFDM symbol for repeatedly transmitting the L-SIG and the HE-SIG is one, the number of each of the OFDM symbols may be equal to or greater than 1.

In addition, although the examples of FIGS. 14 to 17 illustrate that the third OFDM symbol is located between the first OFDM symbol and the second OFDM symbol, the first to the third OFDM symbols may be sequentially located unlike the examples.

Figure 14:
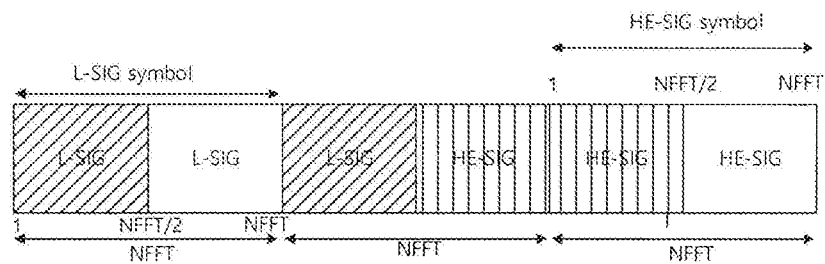
FIGS. 14 to 17 are diagrams for explaining a method for repeatedly transmitting some of signals for an L-SIG and an HE-SIG according to an embodiment of the present invention.
Figure 15:
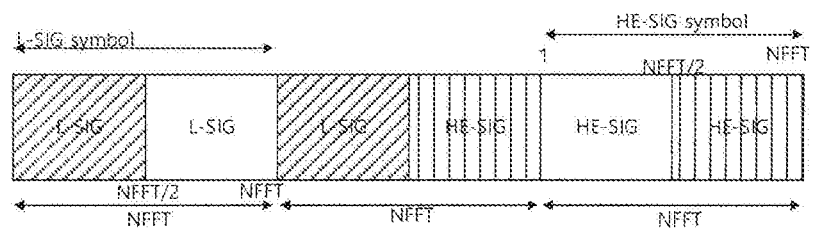
Figure 16:
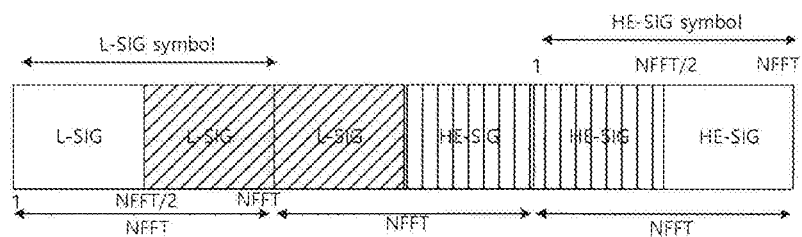
Figure 17:
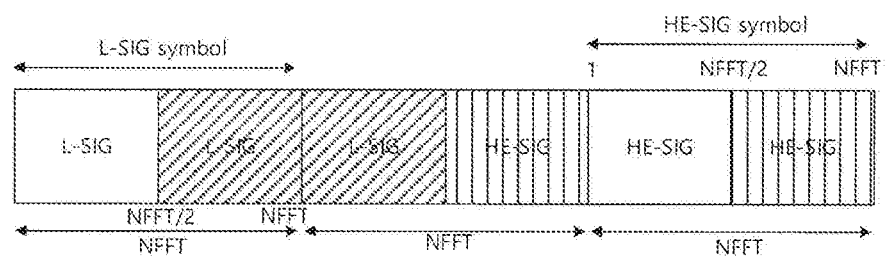

Specifically, FIG. 14 show a case in which the first halves of the L-SIG/HE-SIG are repeated in the third OFDM symbol, FIG. 15 shows a case in which the first half of the L-SIG and the latter half of the HE-SIG are repeated in the third OFDM symbol, FIG. 16 shows a case in which the latter half of the L-SIG and the first half of the HE-SIG are repeated in the third OFDM symbol, and FIG. 17 shows a case in which the latter half of the L-SIG and the latter half of the HE-SIG are repeated in third OFDM symbol.

Meanwhile, the third OFDM symbol for the repetition can be transmitted using the same GI and/or MCS as those used for the first OFDM symbol. In addition, the third OFDM symbol for the repeated transmission can be transmitted using a more robust transmission method, for example, an MCS lower than the MCS0.

In the aforementioned embodiments, the HE-SIG is not classified into the HE-SIG A and the HE-SIG B for convenience of description. However, the HE-SIG can be classified into the HE-SIG A for transmitting common control information and the HE-SIG B for transmitting user-specific information as described above. Therefore, the HE-SIG, which is repeated together with the L-SIG in the third OFDM symbol according to the aforementioned embodiments, may indicate either or both of the HE-SIG A and the HE-SIG B.

Hereinafter, a description will be given of particular means of repeatedly transmitting the L-SIG and the HE-SIG.

Figure 18:
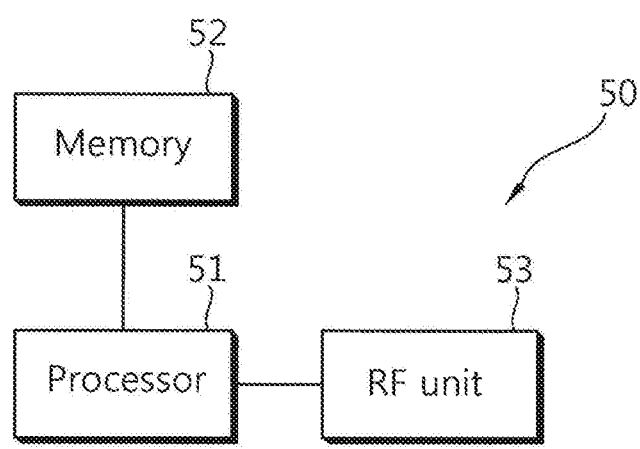
FIGS. 18 to 20 are diagrams for explaining station devices according one aspect of the present invention.
Figure 19:
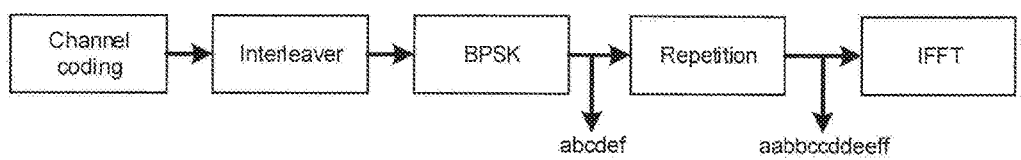
Figure 20:
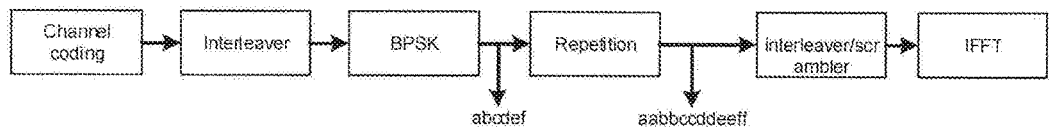

FIGS. 18 to 20 are diagrams for explaining station devices according one aspect of the present invention.

In FIG. 18, a wireless device 50 may correspond to STA1 that transmits a frame or STA2 that receives a frame. Either or both of the STA1 and the STA2 may correspond to an AP. The STA1 50 may include a processor 51, a memory 52, and a radio frequency (RF) unit 53 (i.e., transmitting and receiving unit). The RF unit 53 may include a transmitter for frame transmission and a receiver for frame reception.

In FIG. 18, the processor 50 may be configured to perform the same operation as that described later in FIGS. 19 and 20.

Referring to FIG. 19, the processor 50 may include a channel coder, an interleaver, a modulator and an IFFT module. In addition, it is proposed that the processor additionally includes a repeater to repeatedly transmit the L-SIG and the HE-SIG as described above.

As an embodiment, in the case of the L-SIG and the HE-SIG, signals are configured in the first OFDM symbol and the second OFDM symbol using the MCS0 (i.e., BPSK 1/2). In addition, some or all of the L-SIG/HE-SIG can be repeated by the repeater and then transmitted in the third OFDM symbol.

The signal repetition may be performed such that an entire signal is repeated or some bits of a signal modulated by the modulator are repeated. For example, assuming that a signal generated by passing BPSK 1/2 and a bit interleaver is abcdef . . . as shown in FIG. 19, a signal repeated by the repeater may be determined as aabbccddeeff . . . . In this case, a repetition factor N is assumed to be 2.

Meanwhile, the signal repetition may be performed in unit of n bits where n may be one of 1, 2, 3, 4, 6, 8, 12, and 24. For instance, in case of n=4, assuming that a signal is abcdefgh . . . , a repeated signal may be determined as abcdabcdefghefgh . . . .

The number of times of repetition may be set to be equal to or greater than 2 to improve performance of the L-SIG and/or HE-SIG (i.e., HE-SIG A and/or B). When the repetition factor is 2, it may have the same effect as that when a signal is transmitted using BPSK 1/4 after repeating the signal once.

On the other hand, unlike FIG. 19, the repetition may be performed before the interleaver, that is, immediately after coding is performed by the channel coder.

Further, to improve performance of the aforementioned repeated signal, an additional interleaver/scrambler may be included as shown in FIG. 19.

In the OFDMA, the repeatedly loaded information mentioned in the foregoing description may be transmitted through a basic tone unit (BTU) or a combination of BTUs, which has an allocation size similar to that where the L-SIG/HE-SIG A/B signal is loaded, to guarantee its reception performance In other words, the information may be transmitted using a combination of small allocation sizes or a similar allocation size. For instance, the HE-SIG A may be transmitted using the 1x symbol (64-FFT). In this case, it may be transmitted using 52 tones including four pilots. In addition, in this case, if two BTUs (e.g., 26 tones, 56 tones, etc.) are used to support the OFDMA, data/packet may be transmitted using a 2*26-tone BTU or a 56-tone BTU.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the present invention is described on the assumption that the invention is applied to the WLAN system based on IEEE 802.11, the invention is not limited thereto. The present invention can be identically applied to various wireless systems.

What is claimed is:
1. A method for transmitting a frame by a transmitting station (Tx STA) in a wireless local area network (WLAN) system, the method comprising:
generating a radio frame for a second type of station including a frame portion for a first type of station and a frame portion for the second type of station, the first type of station being a Legacy station (legacy STA) and the second type of station being a High Efficiency Station (HE STA); and
wherein the frame portion for the Legacy STA comprises a first OFDM symbol for transmitting a signaling field (L-SIG) for the Legacy STA,
wherein the frame portion for the HE STA comprises at least one second OFDM symbol for transmitting a signaling field (HE-SIG) for the HE STA, and wherein the radio frame for the HE STA is generated to further comprise at least one third OFDM symbol for repeatedly transmitting the L-SIG and the HE-SIG in one OFDM symbol, transmitting the generated radio frame for the HE STA to a receiving station (Rx STA).

2. The method of claim 1, wherein the radio frame for the HE STA comprises a first interval, which is composed of OFDM symbols with a first length in a time domain, and a second interval, which is composed of OFDM symbols with a length corresponding to an integer multiple of the first length, wherein the first interval comprises the frame portion for the Legacy STA and the HE-SIG, and wherein the second interval comprises a portion obtained by excluding the HE-SIG from the frame portion for the HE STA.

3. The method of claim 2, wherein the first interval further comprises a third OFDM symbol interval.

4. The method of claim 1, wherein the L-SIG and the HE-SIG are repeatedly transmitted through the first to the third OFDM symbols and wherein the repeated transmission corresponds to application of a lowest modulation and coding scheme (MCS) defined for the Legacy STA or an MCS lower than the lowest MCS.

5. The method of claim 1, wherein the L-SIG and the HE-SIG are transmitted such that the L-SIG and the HE-SIG are mapped to different locations in a frequency region corresponding to the third OFDM symbol.

6. The method of claim 1, wherein one of the L-SIG and the HE-SIG is mapped to an even-numbered tone in a frequency region corresponding to the third OFDM symbol and wherein the other one of the L-SIG and the HE-SIG is mapped to an odd-numbered tone in the frequency region corresponding to the third OFDM symbol.

7. The method of claim 1, wherein partial information of the L-SIG transmitted through the first OFDM symbol and partial information of the HE-SIG transmitted through the second OFDM symbol is repeatedly transmitted through the L-SIG and the HE-SIG repeatedly transmitted through the third OFDM symbol, respectively.

8. The method of claim 1, wherein the third OFDM symbol is located between the first OFDM symbol and the second OFDM symbol.

9. The method of claim 1, wherein the HE-SIG comprises a first signaling field (HE-SIG A) for the HE STA, which carries common control information, and a second signaling field (HE-SIG B) for the HE STA, which carries user-specific control information.

10. The method of claim 9, wherein at least one of the HE-SIG A and the HE-SIG B is repeatedly transmitted through the third OFDM symbol.

11. The method of claim 10, wherein a signal that constitutes at least one of the SIG A for the HE STA and the SIG B for the HE STA is repeated N times in unit of n bits where N and n are positive integers equal to or greater than 2.

12. The method of claim 11, wherein at least one of interleaving and scrambling is performed on the N times repeated signal.

13. The method of claim 1, wherein the HE STA is a station that supports communication schemes in accordance with IEEE 802.11ax standards.

14. A station device operating as a transmitting station (Tx STA) in a wireless local area network (WLAN) system, the station device comprising:

a processor configured to generate a radio frame for a second type of station including a frame portion for a first type of station and a frame portion for the second type of station, the first type of station being a Legacy station (legacy STA) and the second type of station being a High Efficiency Station (HE STA); and a transmitter configured to transmit the radio frame for the HE STA generated by the processor, wherein the frame portion for the Legacy STA comprises a first OFDM symbol for transmitting a signaling field (L-SIG) for the Legacy STA, wherein the frame portion for the HE STA comprises at least one second OFDM symbol for transmitting a signaling field (HE-SIG) for the HE STA in one OFDM symbol, and wherein the processor generates the radio frame for the HE STA to further comprise at least one third OFDM symbol for repeatedly transmitting the L-SIG and the HE-SIG.

* * * * *